US006829098B2

(12) United States Patent
Smith (10) Patent No.: US 6,829,098 B2
(45) Date of Patent: *Dec. 7, 2004

(54) ILLUMINATION OPTICS AND METHOD

(75) Inventor: George Edward Smith, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/114,973

(22) Filed: Apr. 2, 2002

(65) Prior Publication Data

US 2002/0114162 A1 Aug. 22, 2002

Related U.S. Application Data

(62) Division of application No. 09/636,528, filed on Aug. 10, 2000, now Pat. No. 6,476,970.

(51) Int. Cl.[7] .............................................. G02B 27/30
(52) U.S. Cl. ...................................... 359/641; 345/163
(58) Field of Search ................................ 359/618, 629, 359/638–641, 726–727, 730, 831, 833–837; 345/156–157, 163, 166

(56) References Cited

U.S. PATENT DOCUMENTS

| | | | | |
|---|---|---|---|---|
| 3,825,322 A | * | 7/1974 | Mast ........................... | 359/799 |
| 4,801,810 A | * | 1/1989 | Koso ........................ | 250/559.34 |
| 4,930,887 A | * | 6/1990 | Burns .......................... | 356/152 |
| 5,194,745 A | * | 3/1993 | Takamiya et al. ........ | 250/559.31 |
| 5,581,348 A | * | 12/1996 | Miura et al. ............. | 356/237.2 |
| 6,081,371 A | * | 6/2000 | Shioda et al. ................ | 359/372 |
| 6,226,092 B1 | * | 5/2001 | DeLega ....................... | 356/512 |
| 6,256,016 B1 | * | 7/2001 | Piot et al. ..................... | 345/166 |
| 6,297,910 B1 | * | 10/2001 | Xuan et al. .................. | 359/618 |
| 6,392,632 B1 | * | 5/2002 | Lee ............................. | 345/158 |
| 6,476,970 B1 | * | 11/2002 | Smith .......................... | 359/618 |
| 6,498,604 B1 | * | 12/2002 | Jensen ......................... | 345/179 |

* cited by examiner

Primary Examiner—Jordan M. Schwartz (57) ABSTRACT

A method and system for producing a compact uniform illumination beam that does not have a positional blind spot. First, non-collimated light beams that have a positional blind spot are received from a light source. Next, the non-collimated light beams are converted into approximately collimated light beams without the positional blind spot. Then, the collimated light beams are split into a plurality of split beams. These split beams are then overlapped to form a compact and uniform illumination beam.

18 Claims, 6 Drawing Sheets

ILLUMINATION OPTICS AND METHOD

This is a Divisional of application Ser. No. 09/636,528, filed on Aug. 10, 2000, now U.S Pat. No. 6,476,970 the entire disclosure of which is incorporated herein by reference.

FIELD OF THE INVENTION

The present invention relates generally to optics, and more particularly, to an optical system and method for producing a compact uniform illumination beam for use in optical navigation devices, such as an optical mouse.

BACKGROUND OF THE INVENTION

Mechanical mice are well known to computer users as a useful tool for positioning a cursor and selecting functions in different applications. These mechanical mice use a ball and related sensors to detect the position of the mice.

In recent years, there has been an increase in the number of manufacturers offering optical mice as an alternative to the mechanical mice because of the increased accuracy and durability of optical mice.

Optical mice use light to detect the position of the mice. Typically, an optical mouse has a light source, such as a light emitting diode (LED), for illuminating a surface, such as a mouse pad or surface of a table. The light strikes the surface and a portion of the light is reflected. The optical mouse has an on-board camera for recording the reflected light. Based on the reflected light, an electronic computation unit determines the position of the optical mouse.

It is important that the illumination beam is as compact and uniform as possible. Since the accuracy of the positional information derived from the reflected light is dependent on minimizing the amount of differences in the light (e.g., contrast) that are caused by the equipment so that the contrasts as closely as possible reflect the surface differences.

Figure 10:
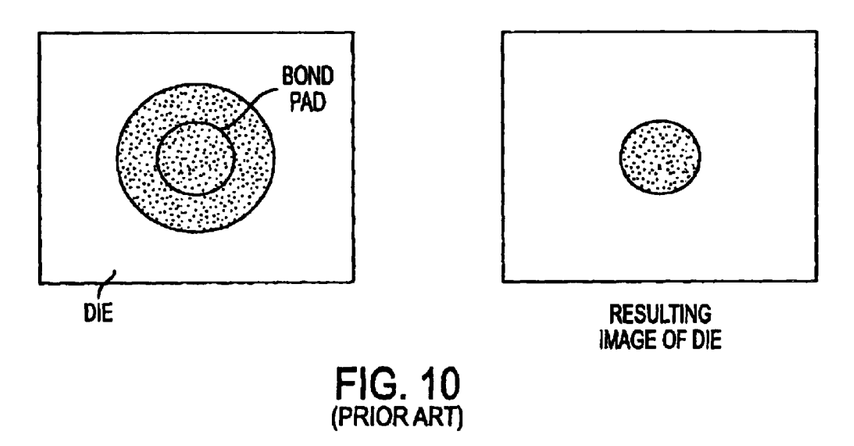
FIG. 10 illustrates a prior art illumination beam having an undesirable dark center region.

Unfortunately, the illumination source that is widely used is an LED die, which has a bond pad and associated wire in the middle of the die. The bond pad and wire cause the resulting image of the illumination beam to have an undesirable dark region in the center. FIG. 10 illustrates an exemplary LED die and the corresponding illumination beam that is produced thereby.

The prior art approaches to lessen the effect of this blind spot or dark region only offer tolerable solutions that each has associated shortcomings. In a first prior art approach, an output face of a prism element is used that has three plane facets at a small angle with respect to each other. This facet arrangement causes the formation of three images of the die that are laterally displaced so that the dark spot of one image falls on a bright bar of an adjacent image. For example, each image is offset in such a manner as to reduce the blind spot with another bright region in the image. Although the non-uniformity (i.e., the dark region or blind spot) in the triple image is less pronounced than before, the resulting image has a lower average luminance. In other words, the slight increase in uniformity is at the expense of the luminance of the illumination spot, which is less bright overall than before.

Figure 11:
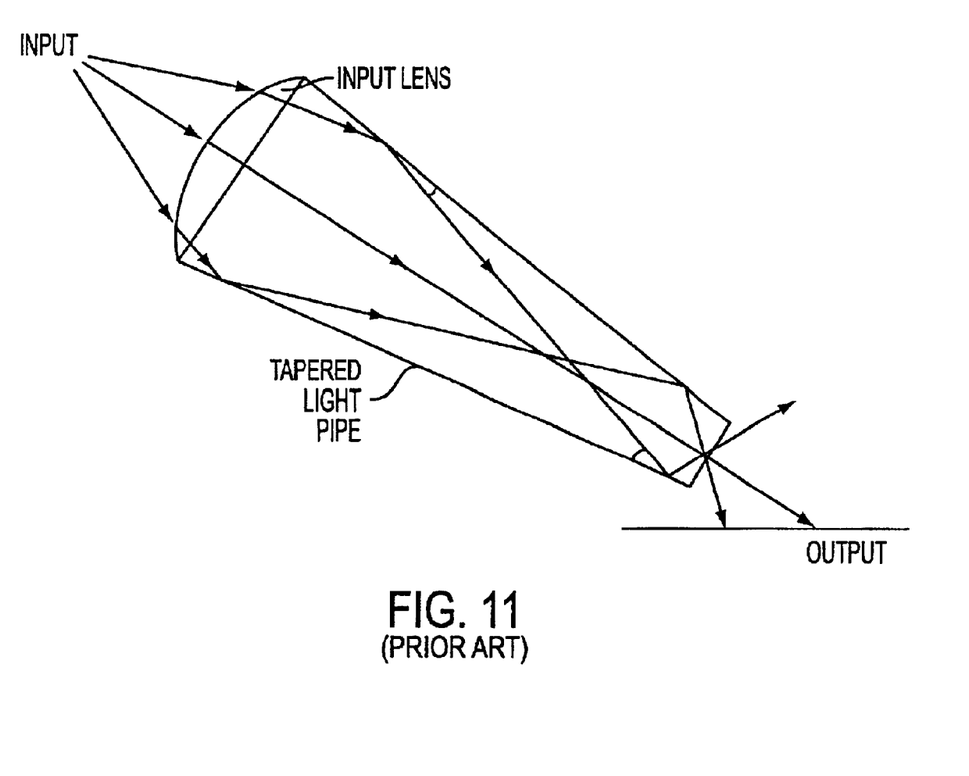
FIG. 11 illustrates a prior art tapered light pipe.

In a second prior art approach, a tapered light pipe shown in FIG. 11 is used to re-direct incoming light and reduce the dark spot. The light pipe is tapered so that the output end is smaller than the input end. The input end collects light flux from the LED. The size of the input is made to have a much larger dimension than the dimension required for the illuminated region.

Unfortunately, this approach offers a design very little control over the routing and angular distribution of the resulting light. The approach also has the following additional disadvantages. First, since the light pipe needs to be an angle relative to the surface to be illuminated, both the light source and light pipe require special mounting to meet these angle requirements, thereby increasing the manufacturing costs. Second, the light travels through the light pipe, the angle of the light beams increases every time the light beam is reflected off of one of the walls of the light pipe. Consequently, the output light beam has a high degree of divergence that results in a high angle of incidence with the surface of illumination. This high angle of incidence may cause certain contrasts resulting from certain types of surfaces to be washed out or negated by the illumination beams, thereby leading to poor performance of the optical mice on certain surfaces.

Based on the foregoing, there remains a need for an optical system and method for producing a compact and uniform illumination beam that overcomes the disadvantages set forth previously.

SUMMARY OF THE INVENTION

According to one aspect of the present invention, a method and system for producing a compact uniform illumination beam that does not have a positional blind spot are provided. First, non-collimated light beams that have a positional blind spot are received from a light source. Next, the non-collimated light beams are converted into approximately collimated light beams without the positional blind spot. Then, the collimated light beams are split into a plurality of split beams. These split beams are then overlapped to form a compact and uniform illumination beam.

In one embodiment, the method and system of producing an illumination beam involves receiving generally divergent light beams, which may be provided by a light emitting diode (LED) light source. Second, these divergent light beams are converted into generally convergent light beams by using a collimating unit, such as a collimating surface, lens, or mirror. Next, the convergent light beams are split and overlapped in one or more directions. For example, in the preferred embodiment, the convergent beams are first split and overlapped in the horizontal direction and then split and overlapped in the vertical direction. The convergent light beams are split and directed and overlapped to form overlapped collimated light beams that produce a compact, uniform illumination area on the illumination surface.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A system and method for producing a bright, compact and uniform illumination beam are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Optical Navigation Device 100

Figure 1:
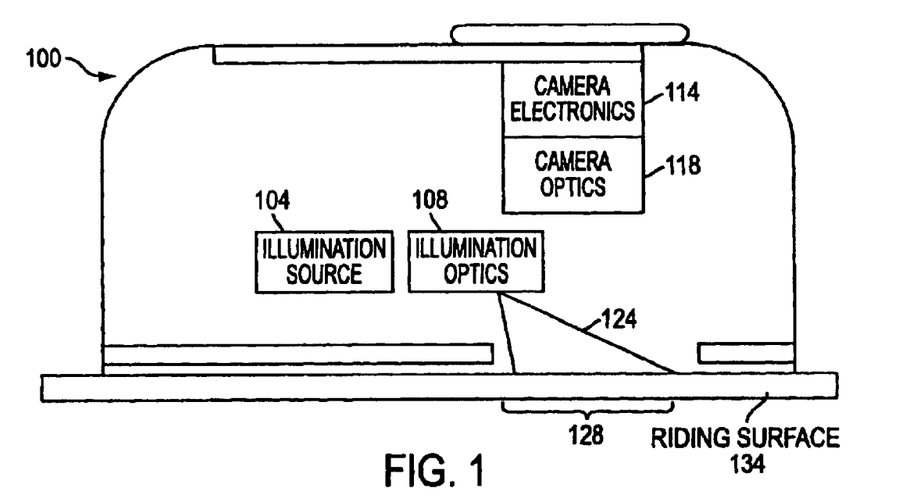
FIG. 1 is a block diagram of an optical navigation device in which the illumination optics of the present invention can be implemented.

FIG. 1 is a block diagram of an optical navigation device 100 in which the illumination optics of the present invention can be implemented. The optical navigation device 100 includes an illumination source 104, illumination optics 108 of the present invention, camera electronics 114, and camera optics 118. The illumination source 104 and illumination optics 108 cooperate to produce an illumination beam 124 for an illumination area 128. The camera optics 118 is provided for receiving light reflected from the illumination surface 128 and capturing the image. The camera electronics 114 are provided for determining the position of the optical navigation device 100 based on the received light.

The optical navigation device 100 rests and moves along on a riding surface 134. The illumination optics 108 of the present invention provides an illumination beam 124 over the illumination area 128 that has a small angular extent and has spatial uniformity so as not to contribute to pattern dependent noise. Furthermore, unlike the tapered light pipe prior art approach, the illumination optics 108 of the present invention produces an illumination beam 124 that is incident on the riding surface 134 at an indirect angle of incidence (e.g., an oblique angle of incidence).

By ensuring that the illumination beam 124 has an indirect angle of incidence, navigation by the optical navigation device 100 is enabled over a larger range of different surface types, especially those surface types (e.g., white paper) that are more sensitive to a high angle of illumination or near normal angle of illumination. Preferably, the optical system and method of the present invention produce a compact illumination beam whose incident angle with respect to the surface of illumination is generally oblique, thereby decreasing the likelihood of the illumination beam illuminating areas of low contrast that are used for tracking purposes. The present invention also provides a very intense illumination beam 124 for the given power consumption requirement.

Illumination Optics 108

Figure 2:
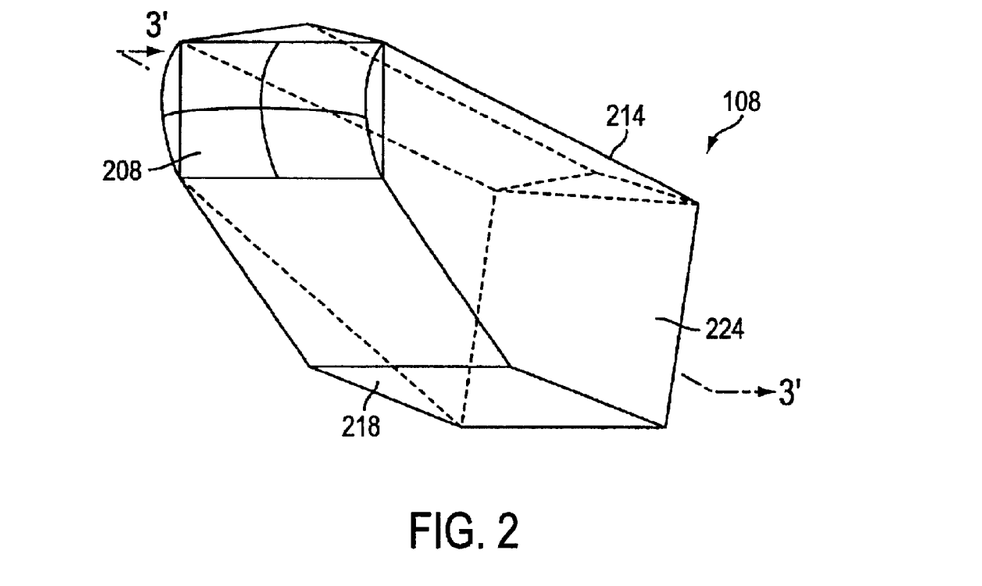
FIG. 2 is perspective view of the illumination optics according to one embodiment of the present invention.
Figure 3:
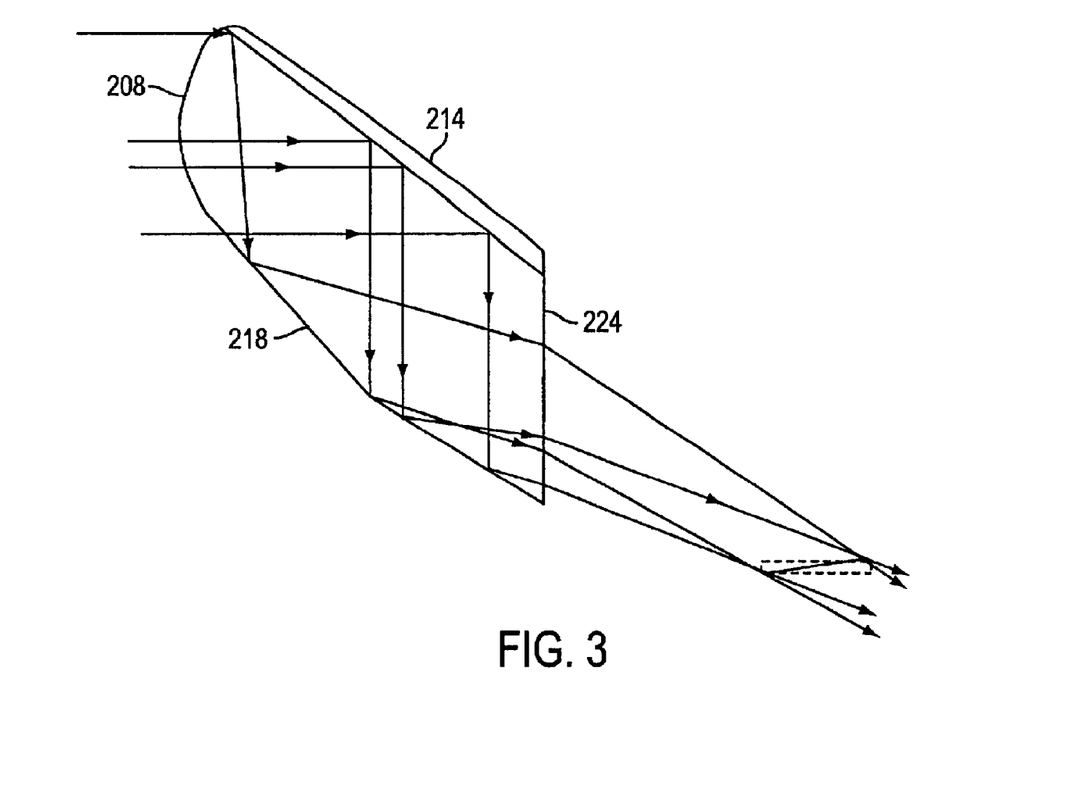
FIG. 3 is sectional view of the illumination optics of FIG. 2 through the line 3'—3'.

FIG. 2 is perspective view of the illumination optics 108 according to one embodiment of the present invention. FIG. 3 is sectional view of the illumination optics of FIG. 2 through the line 3'—3'. The illumination optics 108 includes a collimating unit 208 (e.g., a collimating surface), a first beam-splitting roof 214, a second beam-splitting roof 218, and an output face 224.

The collimating unit 208 receives divergent or convergent light beams from a light source and produces collimated light beams. For example, light from a top surface of a light emitting diode (LED) die is formed into a divergent beam, whose chief ray is at a different angle in space for each different point on the LED surface. In the case of a lamp of suitable optics design, an encapsulating immersion lens forms an approximately distinct point image for each point on the LED die, thereby forming a virtual image of the die that can be viewed from the outside.

In this embodiment, this divergent light is collected by using a wide aperture aspheric collimating lens surface. The lens surface may be hyperbolic in shape (e.g., in the form of a hyperboloid of revolution) or a multifaceted surface. It is generally well known that a hyperbolic refracting surface of suitable eccentricity can form highly collimated beams from an axial source point. For off axis source points, approximately collimated beams can be obtained, but each beam is at a different angle with respect to the optical axis. Consequently, the beam divergence due to the aperture of the lamp lens is canceled out, and the new beam is created with a divergence that depends on the die size and the focal length of the optics.

As described in greater detail hereinafter, the collimating functions performed by the collimating unit 208 can be performed by other collimating surfaces, such as a Fresnel lens or mirror. Moreover, a hyperbolic refracting surface can be combined with other reflecting and refracting surfaces to collimate a more divergent input beam.

It is noted that the divergence of the resulting collimated beam is usually much less than the divergence of the light from the point on the die. Furthermore, the apparent size of the collimated beam is substantially larger than the apparent size of the die. In this regard, the illumination optics of the present invention provides a safety feature that reduces the hazard of exposure of very bright LEDs to the human eye.

In this embodiment, surfaces of a prism are used to bend and re-direct the collimated beam to achieve a desired final incidence angle on the riding surface 134. As the collimated beam is being re-directed, the wave front of the beam can be split into multiple beams by using a reflecting surfaces or facets, refracting surfaces or facets, or a combination thereof. These facets are oriented in such a manner as to direct several sub-beams onto a common illumination area at slightly different angles of incidence.

The first beam-splitting roof 214 is for horizontally splitting and overlapping the collimated beam. The second beam-splitting roof 218 is for vertically splitting and overlapping the collimated beam. In this embodiment, the first and second beam-splitting roofs 214, 218 are reflecting surfaces. As described in greater detail hereinafter, the splitting and overlapping functions performed by the reflective roofs 214, 218 can be performed by using refractive surfaces.

The illumination optics 204 can be implemented as an integral piece of molded plastic that can be mounted or positioned with respect to an illumination source, such as a light emitting diode (LED) package.

Figure 4:
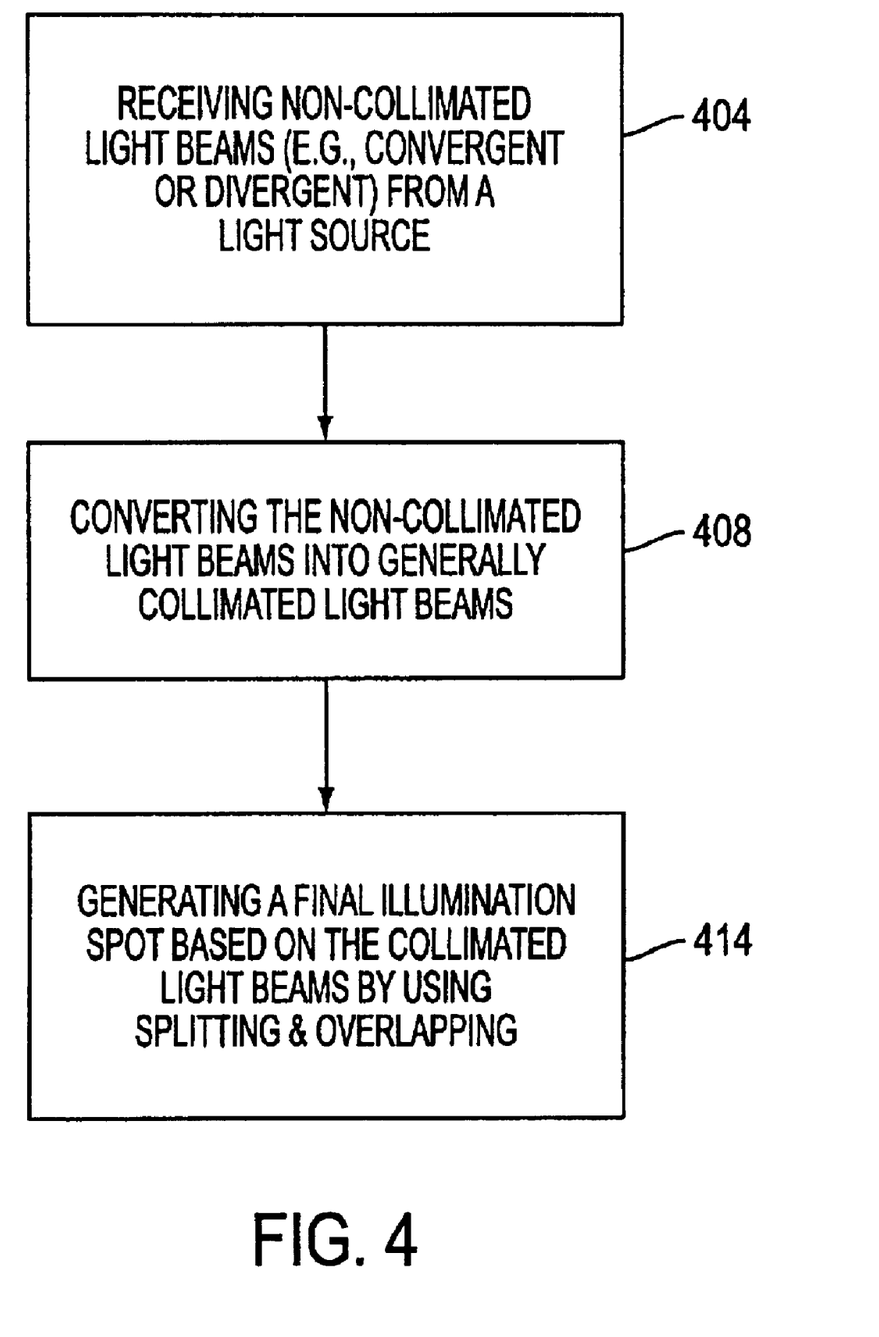
FIG. 4 is a flowchart illustrating the steps performed by the illumination optics of FIG. 2.

FIG. 4 is a flowchart illustrating the steps performed by the illumination optics of FIG. 2. In step 404, generally convergent or divergent light beams are received from a light source, which may be a light emitting diode (LED) light source. In step 408, the generally convergent or divergent light beams are converted into approximately parallel beams (i.e., collimated light beams).

It is important to note that this step transforms a black area in positional space (e.g., a x, y, z coordinate space) into a black area in angular space (e.g., direction space). In other words, this step re-maps a light flux with a positional blind spot into a light flux with an angular blind spot. For example, points of the LED die source that are dark due to the bond pad or other features are mapped into directions in space that are dark. It is noted that each point from which light is emitted produces a generally uniform wave front that is evenly illuminated, but only those directions corresponding to luminous points on the LED die contribute light.

Although the total light flux is the same, the black region in coordinate space is now converted into absence of light in certain directions (i.e., angles) relative to the optical axis. Since the amount of illumination on the illumination surface is not sensitive to certain angles having no light, the step improves the illumination of the "black" region without any penalties or drawbacks to this application.

In step 414, the collimated light beams are conducted, bent, and re-shaped as needed to form a final illumination spot having dimensions that are different from the collimated light beam. For example, the collimated light beams can be split and overlapped. The overlapping and stacking process typically produces a smaller spot of light with a higher level of illumination and a greater uniformity than the light beam prior to step 414. The final illumination spot uniformly illuminates a defined volume around an optical axis of the imaging system. Unlike the tapered light pipe approach, the angle of incidence of the illumination beam generated by the present invention is defined and controlled by the system designer.

It is noted that this step can include the focusing, directing or guiding of the collimated light beams, but does not involve imaging. This step can also be viewed as a compacting process or reducing the dimensions of the collimated light beam while increasing the level of uniformity of the collimated light beam.

One aspect of the illumination optics of the present invention is the provision of a flexible method and system that can use one of many beam steering prism geometries to suit different illumination and imaging applications and requirements. Moreover, the illumination optics of the present invention allows a designer to control the beam size and incidence angles of the illumination beam over a wide range of value to adapt to different design requirements and different produce packaging schemes.

Figure 5:
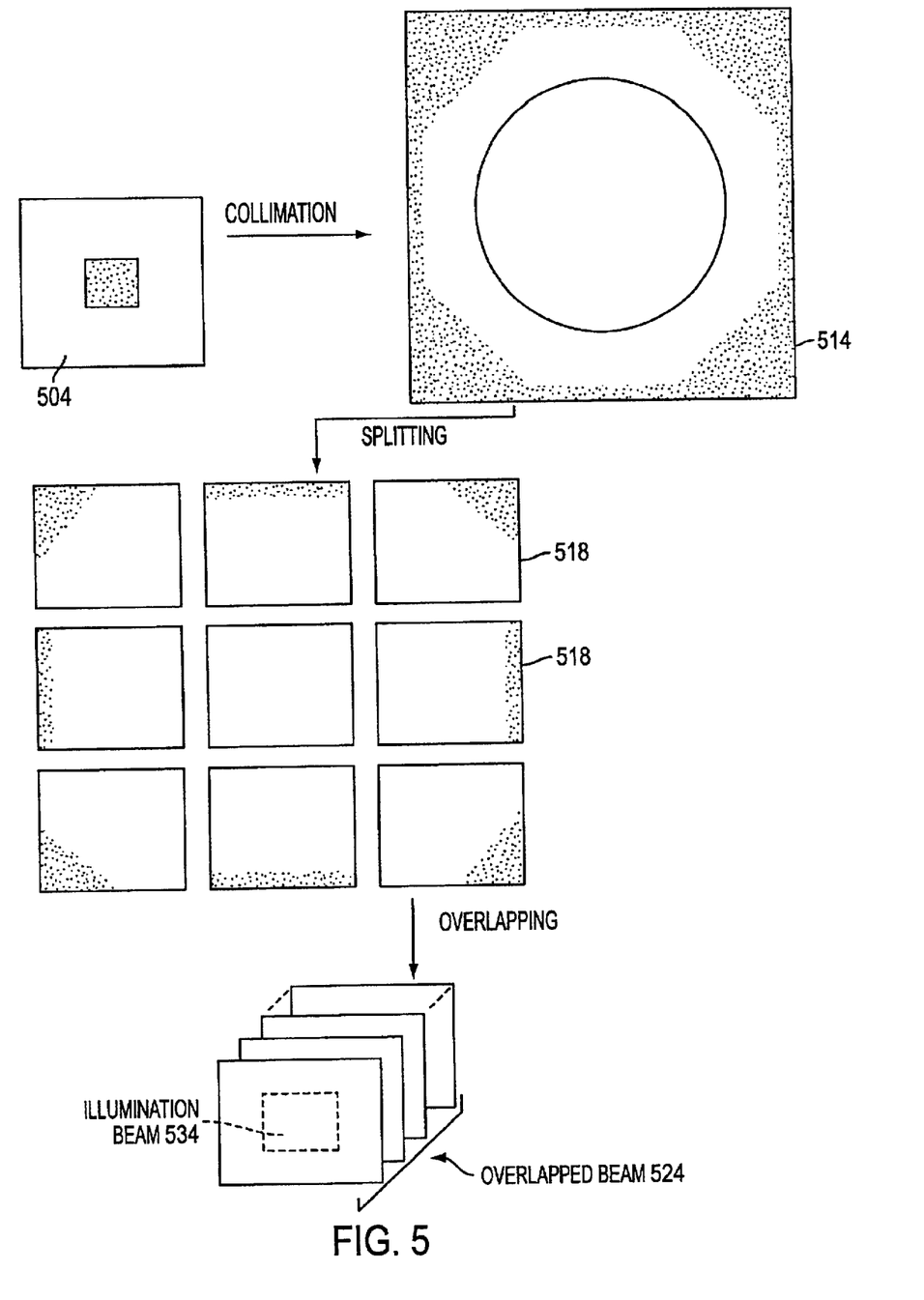
FIG. 5 illustrates the illumination beam at different points in processing by the present invention.

FIG. 5 illustrates the illumination beam at different points in processing by the present invention. The non-collimated illumination beam 504 includes a dark region 508 due to the bond pad in the center of the LED die. The illumination beam 504 has the dimensions of about 1 mm by about 1 mm. After collimating, the collimated illumination beam 514 has the dimensions of about 6 mm by about 6 mm, which is about six times the size of the non-collimated illumination beam 504. It is noted that the collimated illumination beam 514 does not have any dark region corresponding to dark region 508 since the dark region in positional space has been transformed during the collimating process into angles in space where there is an absence of light. As noted earlier, the absence of light at certain angles in space does not adversely affect the requirements or performance for this application.

As with all illumination beams, the center of the collimated beam 514 is brighter than the fringes of the beam 514. Accordingly, the present invention utilizes the steps of splitting and overlapping to correct for this non-uniformity.

The collimated beam 514 is split into a plurality of split collimated beams 518 that are overlapped to form an overlapped collimated beam 524. In this example, nine split collimated beams 518 are overlapped to form the overlapped collimated beam 524. The overlapped collimated beam 524 has the dimensions of about 2 mm by about 2 mm. Once overlapped, the darker fringes of the split beams are smoothed in contrast (e.g., made brighter) by lighter areas of the split beams that correspond to the same location in physical space.

In this application, the region of illumination 534 is about 1 mm by about 1 mm. Accordingly, the illumination beam that illuminates the region of illumination 534 is a compact, bright, and uniform illumination beam.

Use of Fresnel Facets for Collimating

Figure 6:
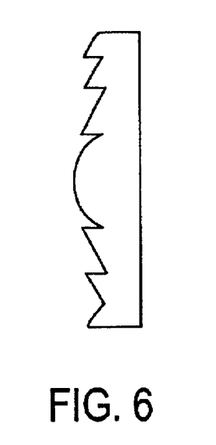
FIG. 6 illustrates a Fresnal lens that can be used for collimating the received light in accordance with the present invention.

FIG. 6 illustrates a Fresnel lens that can be used for collimating the received light in accordance with the present invention.

Figure 7:
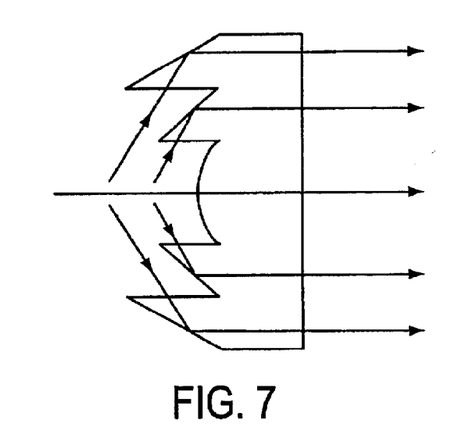
FIG. 7 illustrates a Fresnal mirror that can be used for collimating the received light in accordance with the present invention.

FIG. 7 illustrates a Fresnel mirror that can be used for collimating the received light in accordance with the present invention.

Use of Refracting Facets for Splitting and Overlapping

Figure 8:
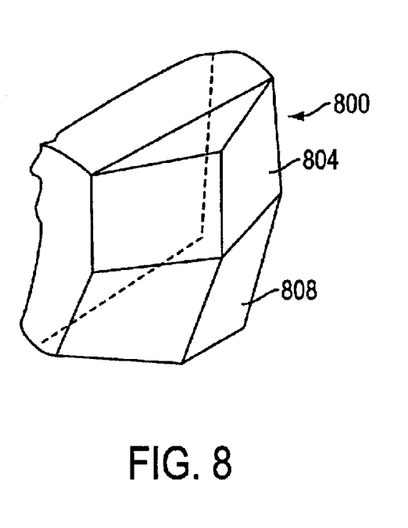
FIG. 8 illustrates one configuration of refracting output facets that can be used to perform the beam splitting function in accordance with the present invention.

FIG. 8 illustrates one configuration of refracting output facets that can be used to perform the beam splitting function in accordance with the present invention. As an alternative to reflecting surfaces or facets, the splitting and overlapping functions performed by the splitting unit of the present invention can be performed by refracting surfaces or facets. The configuration 800 includes a first set 804 of refracing facets for horizontally splitting and overlapping the collimated beams and a second set 808 of refracting facets for vertically splitting and overlapping the collimated beams. This configuration 800 splits the collimated beam into four overlapped collimated beams.

Figure 9:
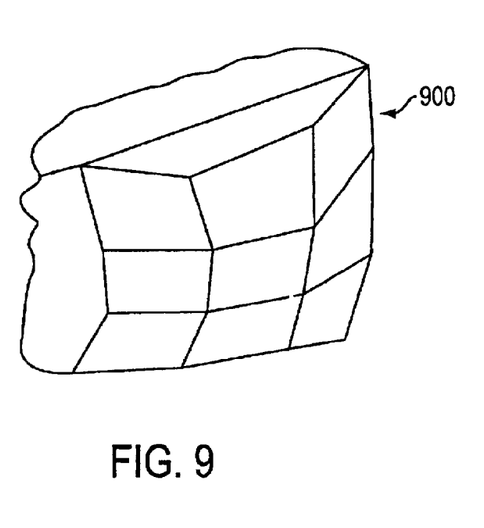
FIG. 9 illustrates an alternative configuration of refracting output facets that can be used to perform the beam splitting function in accordance with the present invention.

FIG. 9 illustrates an alternative configuration of refracting output facets that can be used to perform the beam splitting function in accordance with the present invention. The configuration 900 includes a plurality of refracting facets for horizontally splitting and overlapping the collimated beams and for vertically splitting and overlapping the collimated beams. This configuration 900 splits the collimated beam into nine overlapped collimated beams.

It is noted that FIGS. 8 and 9 illustrate exemplary configurations of refractive surfaces that can be used to perform the splitting and overlapping functions of the present invention. It is further noted that these refracting facets can be used alone or in combination with reflecting facets to perform the splitting and overlapping functions of the present invention. Consequently, the splitting and overlapping functions of the present invention can be carried out by using reflecting facets alone, refracting facets alone, or a combination of reflecting and refracting facets.

The illumination optics of the present invention has been described in connection with an optical navigation device, such as an optical mouse. However, it is noted that the illumination optics is useful for other imaging applications whenever a bright, uniform, compact illumination beam is needed. The illumination optics of the present invention is especially useful for using a light source with a dark region in coordinate space and producing a bright, uniform, and compact illumination beam that does not contain the dark region.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An optical navigation device comprising:
    a light source for generating light beams that include a positional blind spot;
    illumination optics for receiving the light beams with the positional blind spot and responsive thereto for producing an illumination beam without the positional blind spot for illuminating a surface; and
    a camera for receiving reflected beams of the illuminating beam and based thereon for determining positional information of the optical navigation device.

2. The optical navigation device of claim 1 wherein the illumination optics further comprises:
    a collimating unit for receiving non-collimated light beams with the positional blind spot and converting the non-collimated light beams into approximately collimated light beams without the positional blind spot; and
    a beam splitting unit for splitting the collimated light beams into a plurality of split beams and overlapping the split beams to form a compact and uniform illumination beam.

3. The optical navigation device of claim 1 wherein the collimating unit is one of a Fresnel lens, a Fresnel mirror, and a collimating surface of a prism.

4. The optical navigation device of claim 2 wherein the beam-splitting unit is one of a beam-splitting roof of a prism and a plurality of refractive facets.

5. The optical navigation device of claim 1 wherein the optical navigation device is a cursor-pointing device.

6. The optical navigation device of claim 1 wherein the optical navigation device is an optical mouse.

7. The optical navigation device of claim 1 wherein the illumination optics provides an illumination beam that has a predetermined angular extent and spatial uniformity.

8. The optical navigation device of claim 7 wherein the illumination beam provided by the illumination optics does not contribute to pattern dependent noise.

9. The optical navigation device of claim 1 wherein the illumination optics produces an illumination beam that is incident on the surface at an indirect angle of incidence.

10. The optical navigation device of claim 9 wherein the indirect angle of incidence is an oblique angle of incidence.

11. The optical navigation device of claim 1 wherein the illumination optics produces a compact illumination beam whose incident angle with respect to the surface of illumination is generally oblique, thereby decreasing the likelihood of the illumination beam illuminating areas of low contrast that are used for tracking purposes.

12. The optical navigation device of claim 1 wherein the light source includes a light emitting diode (LED) die; and wherein the light emitting diode (LED) die includes at least one feature for creating the positional blind spot in the generated light beam.

13. The optical navigation device of claim 1 wherein the illumination beam without the positional blind spot is a collimated, compact and uniform illumination beam.

14. An optical navigation device comprising:
    illumination optics for receiving light beams with a positional blind spot and responsive thereto for producing an illumination beam without the positional blind spot for illuminating a surface; and
    a camera for receiving reflected beams of the illuminating beam and based thereon for determining positional information of the optical navigation device.

15. The optical navigation device of claim 14 further comprising:
    a light source for generating light beams;
    wherein the light source includes a light emitting diode (LED) die; and wherein the light emitting diode (LED) die includes at least one feature for creating the positional blind spot in the light beams received by the illumination optics.

16. The optical navigation device of claim 14 wherein the illumination beam without the positional blind spot is a collimated, compact and uniform illumination beam.

17. An optical navigation device comprising:
    a light source for generating light beams that include a positional blind spot; wherein the light source includes a light emitting diode (LED) die; and wherein the light emitting diode (LED) die includes at least one feature for creating the positional blind spot in the generated light beam; and
    illumination optics for receiving the light beams with the positional blind spot and responsive thereto for producing an illumination beam without the positional blind spot for illuminating a surface.

18. The optical navigation device of claim 17 wherein the illumination beam without the positional blind spot is a collimated, compact and uniform illumination beam.

* * * * *